US007051513B2

(12) United States Patent
McMullen et al.

(10) Patent No.: US 7,051,513 B2
(45) Date of Patent: May 30, 2006

(54) ROCKET ENGINE TUBULAR CHAMBER WITH SINGLE PIECE JACKET

(75) Inventors: Terrence J. McMullen, Palm Beach Gardens, FL (US); David Hietapelto, Loxahatchee, FL (US)

(73) Assignee: United Technologies Corporation, Hartford, CT (US)

( * ) Notice: Subject to any disclaimer, the term of this patent is extended or adjusted under 35 U.S.C. 154(b) by 418 days.

(21) Appl. No.: 10/456,824

(22) Filed: Jun. 6, 2003

(65) Prior Publication Data

US 2004/0244360 A1    Dec. 9, 2004

(51) Int. Cl.
*F02K 11/00*    (2006.01)
(52) U.S. Cl. .................. 60/260; 60/267; 29/890.01
(58) Field of Classification Search ................. 60/260, 60/267; 29/890.01
See application file for complete search history.

(56) References Cited

U.S. PATENT DOCUMENTS

| 3,390,986 A | 7/1968 | Stenerson |
| 3,460,759 A | 8/1969 | Gregory et al. |
| 3,768,256 A | 10/1973 | Butter et al. |
| 3,897,316 A | 7/1975 | Huang |
| 5,557,928 A * | 9/1996 | Castro et al. .................. 60/260 |
| 6,134,782 A * | 10/2000 | Wright ..................... 29/890.01 |

FOREIGN PATENT DOCUMENTS

| EP | 0 697 515 | 2/1966 |
| WO | WO 95/29785 | 11/1995 |

* cited by examiner

*Primary Examiner*—Charles G. Freay
(74) *Attorney, Agent, or Firm*—Bachman & LaPointe, P.C.

(57) ABSTRACT

A method for forming a coolant system for a rocket engine combustion chamber is provided. The method comprises the steps of providing a plurality of tubes formed and shaped into the profile of a nozzle with each of the tubes having a constantly expanding cross section in an upper chamber area, providing an inlet manifold and an exit manifold with a plurality of holes for receiving an end of each tube, inserting a brazing preform into each hole, inserting a first end of each tube into the inlet manifold and a second end of each tube into the outlet manifold so that the first end is surrounded by a first brazing preform and the second end is surrounded by a second brazing preform, and brazing the inlet and outlet manifolds to the tubes. The brazing step forms a series of brazed joints between the tubes and the manifolds. The method further includes the steps of forming a layer of coating material on exposed portions of the tubes and forming a single piece jacket construction around the tubes.

17 Claims, 4 Drawing Sheets

ROCKET ENGINE TUBULAR CHAMBER WITH SINGLE PIECE JACKET

BACKGROUND OF THE INVENTION

The present invention relates to rocket engines and, more particularly to a tubular rocket engine combustion chamber.

The rocket engine combustion chamber contains the combustion of pressurized fuel and oxidizer and the smooth acceleration of the combustion products to produce thrust. The oxidizer and fuel are introduced under pressure through the injector 10, such as that shown in FIG. 1, attached to the top of the chamber. The combustion products under pressure advance to a de Laval nozzle 12, where the internal profile converges to a throat 14. Here the expansion of the combustion products achieve sonic velocity. The convergent throat section is immediately followed by a divergent section 16. The combustion products are then further accelerated to many times the speed of sound depending on the profile of the divergent section, the oxidizer and fuel combination, the pressure of the combustion products and the external pressure. The acceleration of gases creates thrust for the rocket engine.

Regenerative cooled combustion chambers take part of the flow of cryogenic liquid propellant, usually fuel, to cool the walls of the combustion chamber. The coolant flows along the outside of the chamber through passages or tubes. The coolant recycles the waste heat to increase energy in the coolant. This increase energy in the coolant improves the efficiency of the cycle.

Regenerative cooled combustion chambers for rocket engines typically fall into three categories: milled channel, platelet, and tubular construction.

In a milled channel construction, grooves of varying cross section are cut into the exterior of a liner, which assumes the shape of a de Laval nozzle. A jacket is built up over the open channels or a cylindrical piece is slid on and vacuum compression brazed to the liner. The jacket resists the coolant pressure only.

A platelet construction is similar to a milled channel but divides the length of the liner into many smaller sections, which are then bonded together. A multiple piece jacket is then welded together over the liner and vacuum compression brazed together.

A tubular combustion chamber stacks formed tubes in the shape of a de Laval nozzle. The tubes contain the pressurized propellants for cooling the chamber walls and picking up waste heat to use in the cycle. The finished jacket assembly resists the pressure load of the combustion products only.

A tubular construction combustion chamber can be manufactured in two ways depending on its size. If the chamber is large enough in diameter to allow access, the tubes and braze material can be laid directly into a single piece jacket and furnace brazed.

Smaller chambers do not allow the use of a single piece jacket because access is limited to insert tubes inside a small diameter jacket. Assembly starts by stacking formed tubes on a mandrel in the shape of a de Laval nozzle. The tubes can be laid straight along the length of the mandrel or can be spiral wrapped around the mandrel. Braze wire, paste, or foil is inserted into all the cavities between the tubes. A multiple piece jacket is then added to the outside of the tubes. The jacket segments are then covered with overlapping strips between the jacket segments. The jackets and tubes are then furnace brazed together. The tubular construction chamber integrity depends on the quality of construction of the jacket and braze coverage for all joints between the tubes and the chamber manifolds and stiffening rings. Only X-ray or sonic inspection methods can accomplish inspection of the brazed tube to tube and jacket to tube joints. Repair of the brazed areas under the jacket is difficult. Failure of the combustion chamber can occur because inspection techniques were insufficient to identify areas of inadequate braze coverage.

The tubular construction chamber yields the lightest and most efficient chamber due to the larger heat transfer area and lower stressed tube cross sections. The tubular construction chamber integrity depends on the quality of construction of the multiple piece jacket and braze coverage for all joints between the tubes, jacket segments, and manifolds.

SUMMARY OF THE INVENTION

Accordingly, it is an object of the present invention to provide a method of constructing a regeneratively cooled tubular combustion chamber which allows the tubes to be stacked, adjusted and inspected for gaps on an external mandrel, while allowing complete inspection of the braze joints prior to installation of a single piece jacket.

The foregoing object is attained by the method of the present invention.

In accordance with the present invention, a method for forming a coolant system for a rocket engine combustion chamber is provided. The method broadly comprises the steps of providing a plurality of tubes formed and shaped into the profile of a nozzle with each of the tubes having a constantly expanding cross section in an upper chamber area, providing an inlet manifold and an exit manifold with a plurality of holes for receiving an end of each tube, inserting a brazing preform into each hole, inserting a first end of each tube into the inlet manifold and a second end of each tube into the outlet manifold so that the first end is surrounded by a first brazing preform and the second end is surrounded by a second brazing preform, and brazing the inlet and outlet manifolds to the tubes. The brazing step forms a series of brazed joints between the tubes and the manifolds. The method further includes the steps of forming a layer of coating material on exposed portions of the tubes and forming a single piece jacket construction around the tubes.

The present invention also relates to a regeneratively cooled tubular construction rocket engine combustion chamber having a de Laval nozzle. The combustion chamber broadly comprises a plurality of tubes for conveying a coolant, each of the tubes being formed and shaped into the profile of the de Laval nozzle, an inlet manifold and an exit manifold, each of the tubes having a first end brazed to the inlet manifold and a second end brazed to the exit manifold, a layer of coating material on exposed portions of the tubes, and a single piece jacket construction surrounding the tubes and the layer of coating material and being joined to the tubes.

Other details of the rocket engine tubular chamber with single piece jacket, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
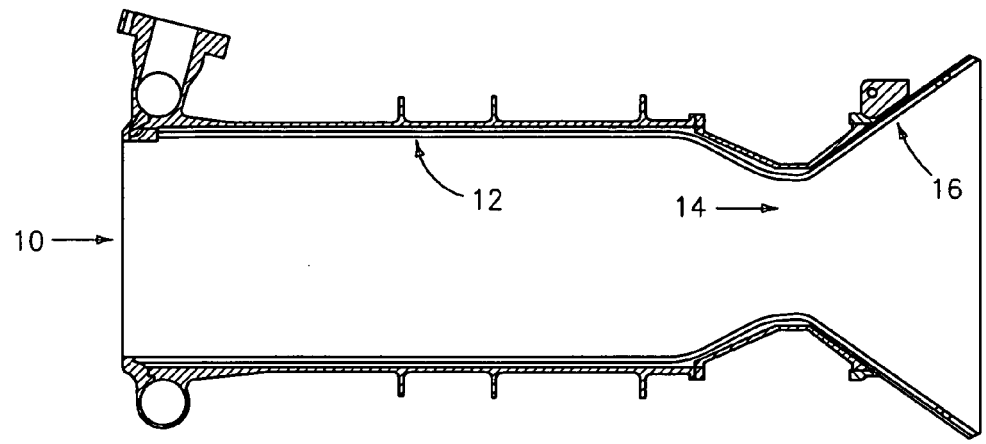
FIG. 1 is a cross section of a tubular chamber.
Figure 2:
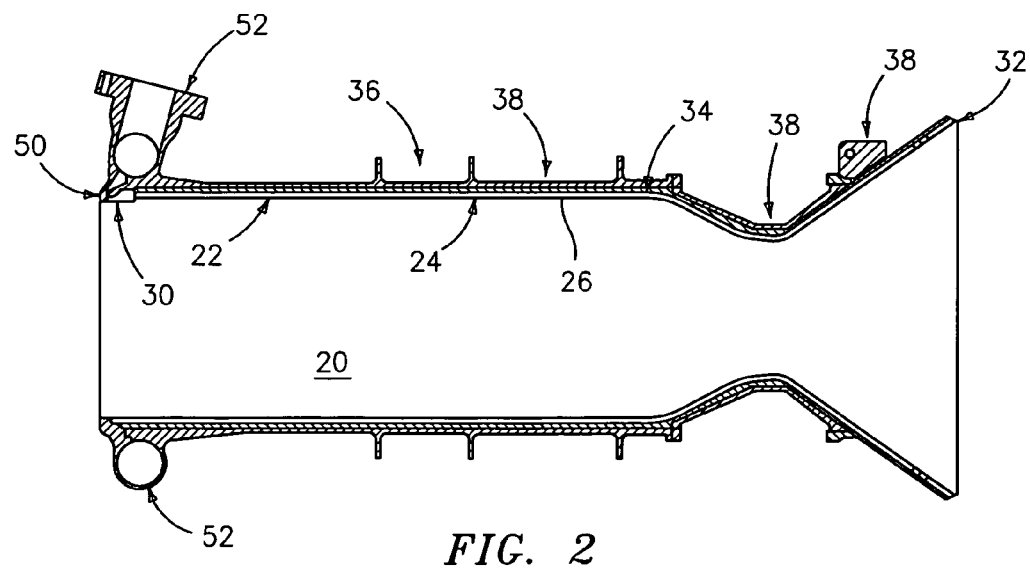
FIG. 2 is a cross section of a tubular chamber in accordance with the present invention.
Figure 3:
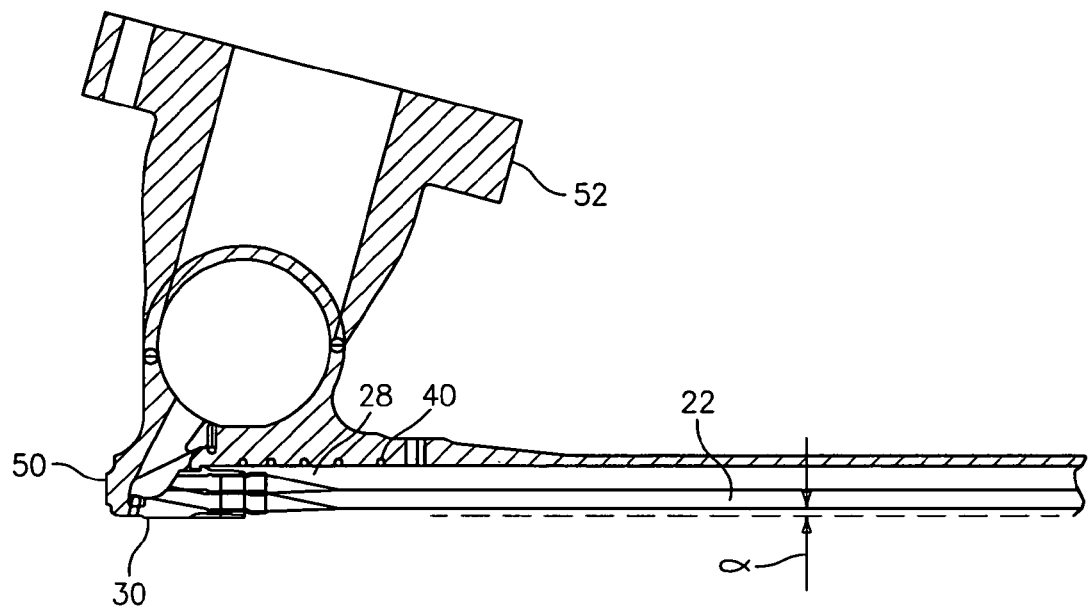
FIG. 3 is a detailed cross section view of the exit manifold of the chamber of FIG. 2.
Figure 4:
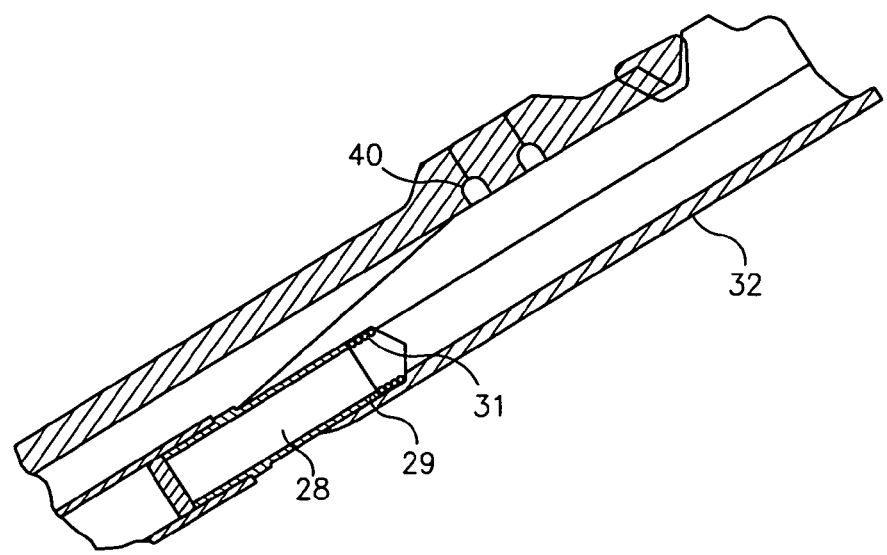
FIG. 4 is a detailed cross section view of the inlet manifold of the chamber of FIG. 2.
Figure 5:
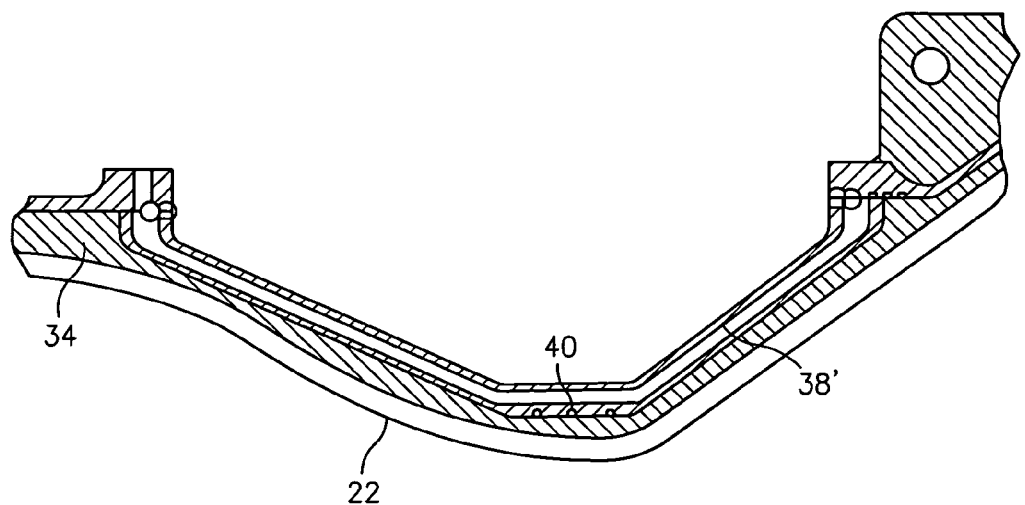
FIG. 5 is a detailed cross section view of the throat of the chamber of FIG. 2.

Referring now to FIGS. 2–5 of the drawings, the tubular construction chamber 20 consists of a set of tubes 22 formed and shaped into the profile of a de Laval nozzle. The tubes 22 feature a constantly expanding cross section in the upper chamber area 24 to provide a tapered inner wall 26. The expanding cross section refers to the inside cavity of the chamber 20 that the profile of the stack of tubes 22 creates. The profile of the tube 22 is farther away from the chamber centerline at the injector end of the chamber 20 than it is downstream. This forms a taper angle $\alpha$ of less than 1 degree.

The provision of a tapered inner wall 26 improves removal of a mandrel (not shown) for tube bundle support during processing. The mandrel that supports the tubes 22 during brazing is inserted and removed through the injector end of the chamber 20. If the mandrel and tube profile were cylindrical, the mandrel would have to be dragged over the length of the tubes 22 for insertion or removal. This would subject the thin walled tubes 22 to possible damage. A tapered tube profile is supported by an identical tapered profile mandrel. Because of the taper, the mandrel does not touch the tube profile until the mandrel is fully inserted into the chamber. As the mandrel is removed, a gap is created between the tubes 22 and the mandrel. This gap increases as the mandrel is moved further out of the chamber. Once the mandrel is far enough away from the tubes 22, sections of the mandrel's circumference can be individually removed from inside the chamber.

Figure 6:
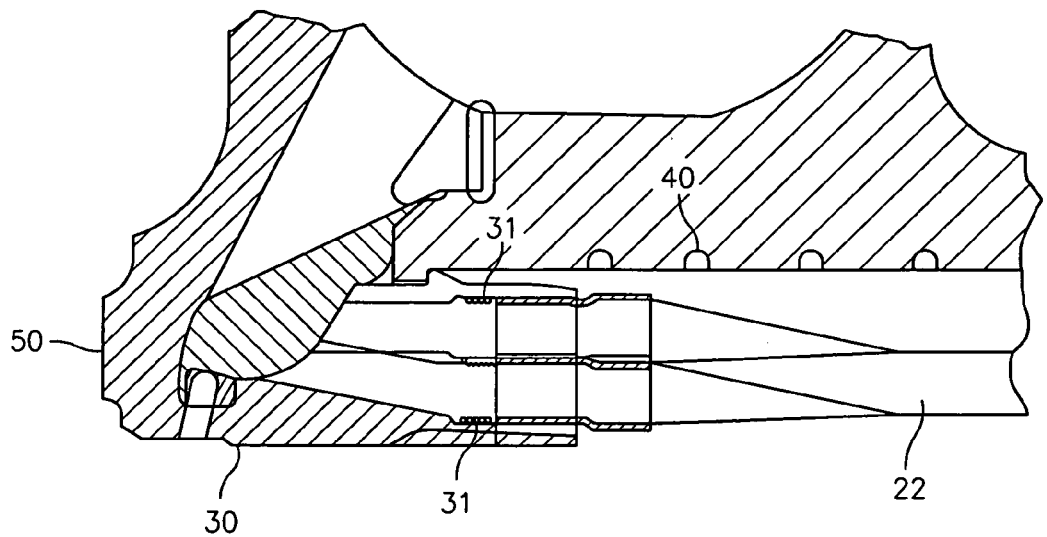
FIG. 6 is a cross section view showing the braze preform coils.

Depending on the tube material, ferrules 28 may be brazed or welded to both ends of each tube 22 to create a tube assembly. Tubes 22 are typically made of steel based alloys, nickel based alloys or copper based alloys, depending upon the materials compatibility with the propellants used. The ferrules 28 can be steel or nickel based alloys depending upon the propellants used and the method of attachment to the tube materials. Each of the tubes or tube assemblies is inserted into a plurality of holes 29 in an exit manifold 30 and an inlet manifold 32. The tubes or tube assemblies are set up with braze preforms 31 inserted into manifold holes to achieve the desired coverage. As shown in FIG. 6, the braze preforms 31 are helical coils of braze wire made to fit in the diameter of the manifold holes. The manifold holes are stepped to trap the braze perform 31 in place under the ferrules 28. The assembly is then furnace brazed. The brazing operation used is dependent upon the materials involved and the braze material chosen to join the parts together. In addition, if there are several braze operations used to construct the chamber 20, each succeeding braze operation must be performed at a lower temperature than the previous braze operations in order to prevent re-melting those braze joints. In general, braze operations are performed between 1400 F and 2000 F with braze times for the gradual heat up and cool down of the parts dependent upon the mass of the parts involved.

Following inspection of the brazed joints, exposed portions of the tubes 22 are then coated with a layer of material 34 similar to the tube material to the desired depth. The coating material 34 can be any material that will create a bond with the tube materials. In general the material should be similar to the tube material so that differences in the thermal growths and modulus of elasticity of the two materials does not create additional stress on the bond. Materials can be steel, nickel, or copper alloys. Also the materials can be used together to form different layers in the coating.

The layer of coating material 34 can either be vacuum plasma sprayed on, or electroplated onto, the tube surfaces using any suitable vacuum plasma spraying or electroplating techniques known in the art. The layer of coating material 34 provides sealing between the tubes 22, protects the tubes 22 from damage during assembly of the jacket, and after machining, provides a close tolerance surface to mate to the single piece jacket 36.

Figure 7:
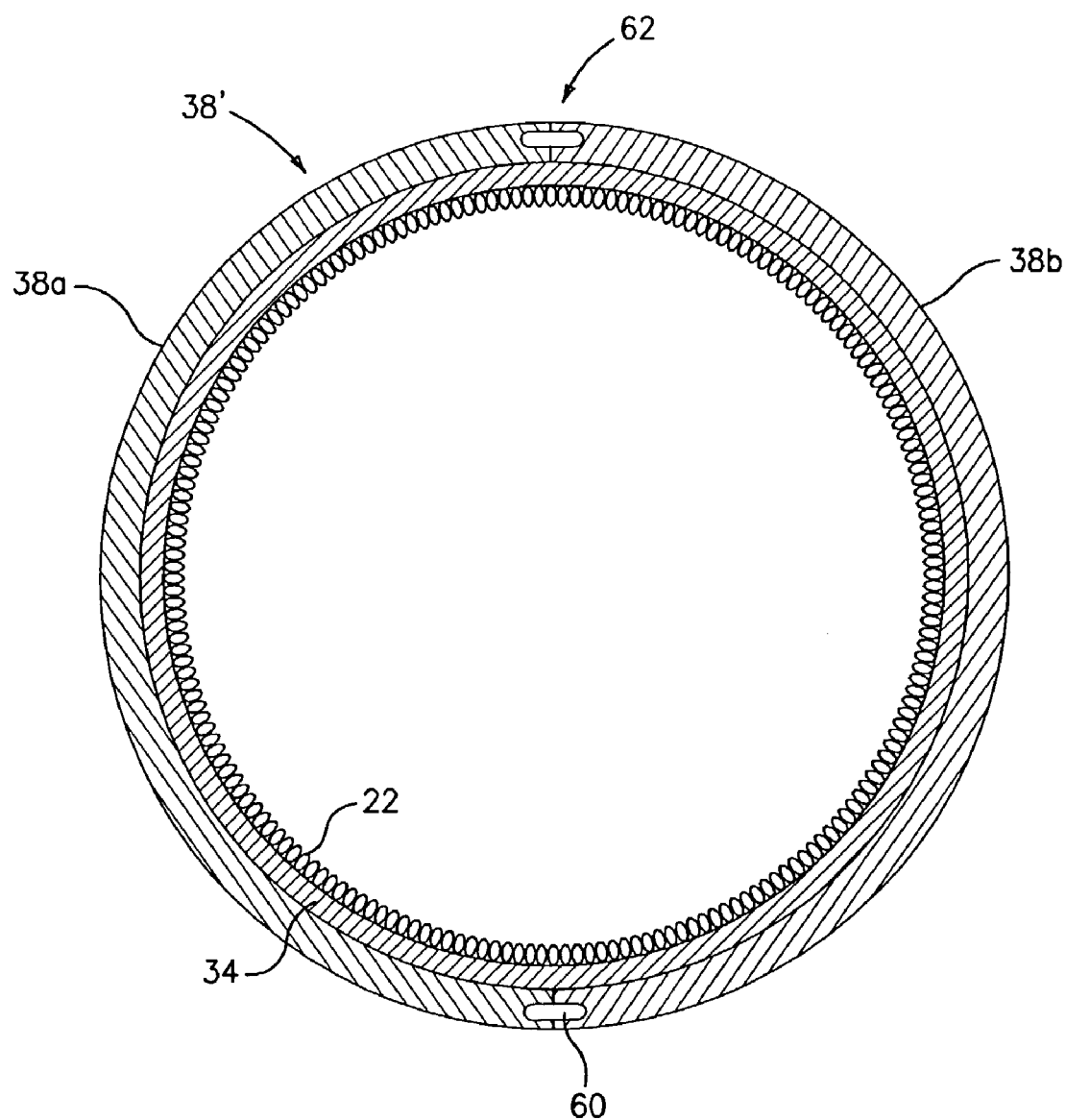
FIG. 7 is a sectional view of a rocket engine combustion chamber.

Jacket sections 38 are then installed over the machined coating. The jacket sections 38 may be formed from any steel or nickel alloys that are compatible with the braze systems used and are compatible with welding and brazing. Braze wire can be installed in circumferential grooves 40 on the inside of each jacket section 38. As shown in FIG. 7, the throat jacket section 38' consists of two 180 degree circumferential segments 38a and 38b. The jacket sections 38 and 38' are joined together, such as by welding, and to the inlet and exit manifolds 32 and 30 respectively, also such as by welding, to achieve a single piece jacket construction 36. The single piece jacket construction 36 is then brazed to the coated tube bundle. The jacket sections 38 are welded together and then they are welded to the exit and inlet manifolds 30 and 32, respectively, to form an air tight gap between the jacket sections and the coating over the tubes 22. Braze material may be plated onto the inner surface of the jacket sections and the outer surface of the coating 34 over the tubes 22. Several ports are installed in the jacket sections to allow a vacuum to pull the two surfaces together in intimate contact during the braze cycle. This brazing operation will be the lowest temperature braze used in the construction of the chamber 20 in order to prevent re-melting previously brazed joints. The braze times for the gradual heat up and cool down of the parts are dependent upon the mass of the parts involved.

An end cap 50 on the forward end is then joined to the exit manifold 30 and the single piece jacket 36. Any suitable joining technique such as welding may be used. The exit manifold closeout sections 52 are then joined to the single piece jacket 36. Here again, any suitable joining technique such as welding may be used.

Referring again to FIG. 7, a rocket engine combustion chamber is shown wherein the jacket sections include two 180 degree circumferential throat sections or halves 38a and 38b.

FIG. 7, through the throat region shows the two throat jacket halves 38a and 38b, the coating layer 34 over the tubes and the tubes 22. The oval tunnels 60 through the jackets at the weld joint 62 allow inspection of the welds and also provide distribution of the vacuum from the main jacket ports to the throat jacket and aft jacket areas during the furnace brazing operation for the joints between the jackets and the coating layer 34 over the tubes. After all welding, brazing, inspection, washing and baking operations are complete, the tunnels 60 may be filled with a compatible sealant compound to prevent leakage around the throat area.

It is apparent that there has been provided in accordance with the present invention a rocket engine tubular chamber with single piece jacket which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method for forming a coolant system for a rocket engine combustion chamber comprising the steps of:
    providing a plurality of tubes formed and shaped into the profile of a nozzle with each of said tubes having a constantly expanding cross section in an upper chamber area;
    providing an inlet manifold and an exit manifold with a plurality of holes for receiving an end of each said tube;
    providing a plurality of ferrules;
    inserting a brazing preform into each said hole;
    inserting a first end of each said tube into said inlet manifold and a second end of each said tube into said outlet manifold so that said first end is surrounded by a first brazing preform and said second end is surrounded by a second brazing preform;
    brazing said inlet and outlet manifolds to said tubes, said brazing step forming a series of brazed joints between said tubes and said manifolds; and
    joining said ferrules to said tubes prior to said tube inserting step so as to form a tube assembly.

2. The method according to claim 1, wherein said joining step comprises welding said ferrules to said tubes.

3. The method according to claim 1, wherein said joining step comprises brazing said ferrules to said tubes.

4. The method according to claim 1, further comprising:
    inspecting said brazed joints; and
    coating exposed portions of said tubes with a layer of coating material.

5. The method according to claim 4, wherein said coating step comprises electroplating said coating material onto said exposed portions.

6. The method according to claim 4, wherein said coating step comprises vacuum plasma spraying said coating material onto said exposed portions.

7. The method according to claim 4, further comprising:
    installing jacket sections over said layer of coating material; and
    joining said jacket sections to said manifolds and to each other to form a single piece jacket construction.

8. The method according to claim 7, wherein said joining step comprises welding said jacket sections to said manifolds and to each other.

9. The method according to claim 7, further comprising brazing said single piece jacket construction to said coated tubes.

10. The method according to claim 7, further comprising joining an end cap to said exit manifold and to said single piece jacket construction.

11. The method according to claim 7, further comprising joining exit manifold closeout sections to said single piece jacket construction.

12. A regeneratively cooled tubular construction rocket engine combustion chamber having a de Laval nozzle comprising:
    a plurality of tubes for conveying a coolant, each of said tubes being formed and shaped into the profile of said de Laval nozzle;
    an inlet manifold and an exit manifold;
    each of said tubes having a first end brazed to said inlet manifold and a second end brazed to said exit manifold;
    a layer of coating material on exposed portions of said tubes;
    a single piece jacket construction surrounding said tubes and said layer of coating material and being joined to said tubes; and
    a plurality of ferrules joined to said tubes.

13. A rocket engine combustion chamber according to claim 12, further comprising each of said tubes has a constantly expanding cross section in an upper chamber area.

14. A rocket engine combustion chamber according to claim 12, wherein said single piece jacket constructions includes a plurality of jacket sections joined together and joined to said inlet and exit manifolds.

15. A rocket engine combustion chamber according to claim 14, wherein said jacket sections include two 180 degree circumferential throat sections.

16. A rocket engine combustion chamber according to claim 12, further comprising an end cap joined to the exit manifold and the single piece jacket construction.

17. A rocket engine combustion chamber according to claim 12, further comprising exit manifold closeout sections joined to said single piece jacket construction.

* * * * *